United States Patent [19]

Ellard

[11] Patent Number: 5,248,158
[45] Date of Patent: Sep. 28, 1993

[54] SIDECAR FOR BICYCLES

[76] Inventor: Terence R. Ellard, 6717 Palatine Ave. North, Seattle, Wash. 98103

[21] Appl. No.: 732,463

[22] Filed: Jul. 18, 1991

[51] Int. Cl.$^5$ ............................................. B62K 27/12
[52] U.S. Cl. ...................................... 280/203; 280/30; 280/62
[58] Field of Search .................... 280/203, 204, 30, 62; 296/161, 172

[56] References Cited

U.S. PATENT DOCUMENTS

| | | | |
|---|---|---|---|
| D. 297,525 | 9/1988 | Baechler | D12/129 |
| 1,068,835 | 7/1913 | Bamford | 280/203 |
| 1,069,788 | 8/1913 | Johnson | 280/203 |
| 1,080,020 | 12/1913 | Pothast | 280/203 |
| 1,235,177 | 7/1912 | Young | 280/203 |
| 1,417,822 | 5/1922 | Grew | 280/203 |
| 1,437,115 | 11/1922 | Morton | 280/203 |
| 2,494,707 | 1/1950 | Hill | 280/203 |
| 2,702,196 | 2/1955 | Gamaunt | 280/203 |
| 3,788,670 | 1/1974 | Petersen | 280/203 |
| 4,378,121 | 3/1983 | Rans | 280/203 |
| 4,385,770 | 5/1983 | Mitchell | 280/203 |
| 4,477,097 | 10/1984 | Hayes | 280/203 |
| 4,840,420 | 6/1989 | Weber | 280/203 |
| 5,076,599 | 12/1991 | Lockett et al. | 280/204 |

FOREIGN PATENT DOCUMENTS

| | | | |
|---|---|---|---|
| 109813 | 5/1984 | European Pat. Off. | |
| 825061 | 12/1951 | Fed. Rep. of Germany | |
| 2640575 | 6/1990 | France | |
| 9228 | of 1906 | United Kingdom | |
| 22907 | of 1912 | United Kingdom | 280/203 |
| 218946 | 7/1924 | United Kingdom | |
| 771184 | 3/1957 | United Kingdom | 280/203 |

*Primary Examiner*—Mitchell J. Hill
*Attorney, Agent, or Firm*—Jensen & Puntigam

[57] ABSTRACT

The sidecar (12) includes a sidecar frame assembly (14) which is joined by two connecting assemblies (76, 77), one near the lower end of the sidecar frame assembly (10) and one near the upper end thereof, such that there is defined a parallelogram-like structural arrangement. Swivel connections are provided at each connection point, so that the sidecar (12) is free to follow the action of the bicycle (10).

8 Claims, 6 Drawing Sheets

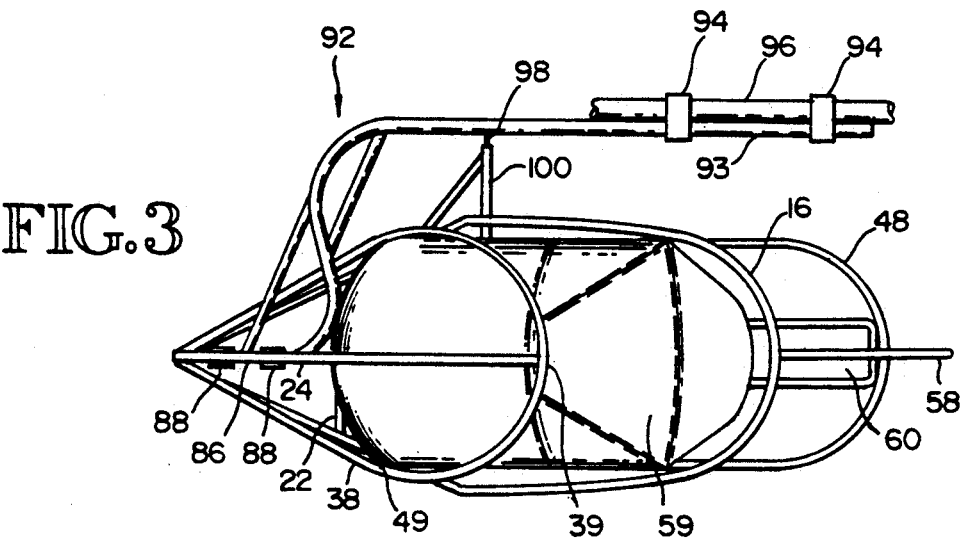
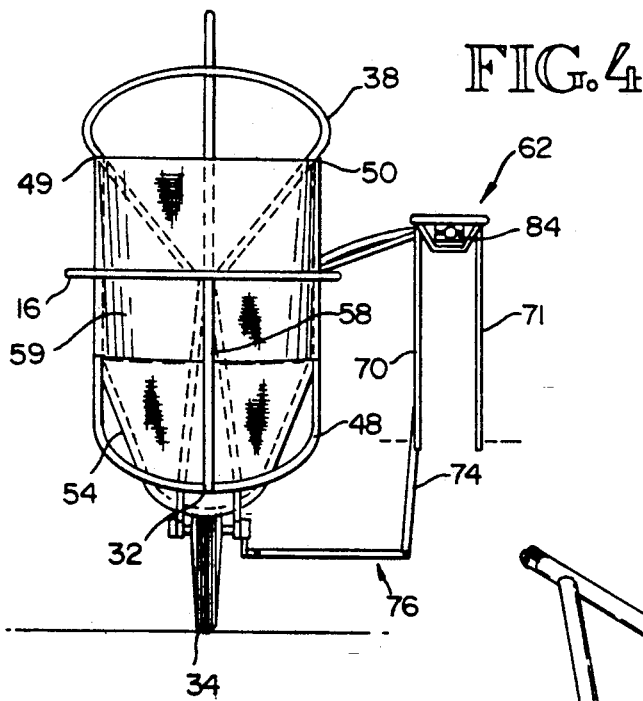
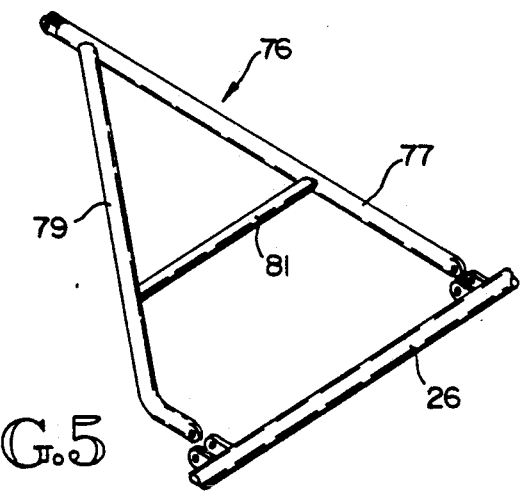

5,248,158

SIDECAR FOR BICYCLES

TECHNICAL FIELD

This invention relates generally to sidecar-type vehicles and more particularly concerns a sidecar which is particularly adapted for use with bicycles.

BACKGROUND OF THE INVENTION

There has historically existed a desire as well as a need for sidecar-type vehicles for use with, for instance, motorcycles and bicycles. Such sidecar vehicles, which are used primarily to carry passengers, are known in a variety of configurations and in varying complexity. Sidecar vehicles particularly adapted for use with bicycles are of increasing interest, due to the emphasis on bicycle riding in general, particularly for fitness purposes, and the accompanying need to conveniently accommodate children who are not large enough or otherwise capable of riding their own bicycle.

While the traditional child bicycle seat, mounted over the rear tire of the bicycle, to some extent satisfies this need, such an arrangement does place the child out of view of the user of the bicycle and sometimes creates problems with the balance of the bicycle, particularly with larger children. The rear bicycle seat may also be more dangerous than a sidecar arrangement. However, sidecars for bicycles have not been heretofore particularly favored, since they are often cumbersome to operate with the bicycle, and do not accurately follow the movement of the bicycle, particularly as the bicycle leans in one direction or the other.

DISCLOSURE OF THE INVENTION

Accordingly, the present invention is a sidecar for a bicycle, which includes a sidecar assembly, including a portion thereof which is adapted to support a passenger, wherein the sidecar assembly includes a wheel positioned within the assembly such that the passenger is positioned substantially directly above the wheel; first connecting means extending between the sidecar assembly to the bicycle at points in the vicinity of the axles of the respective wheels; and second connecting means extending between the sidecar assembly and the bicycle at points located a distance above the first connecting means, wherein the first and second connecting means each have swivel connections between the sidecar assembly and the bicycle, such that the sidecar moves in approximately mirror fashion to movement of the bicycle.

BRIEF DESCRIPTION OF THE DRAWINGS

FIG. 3 is a top view of a second embodiment of the sidecar of the present invention.

FIG. 4 is a front elevational view of the sidecar of FIGS. 1 and 2.

FIG. 5 is a isometric view of the first connecting assembly of the sidecar of FIG. 1.

BEST MODE FOR CARRYING OUT THE INVENTION

Figure 1:
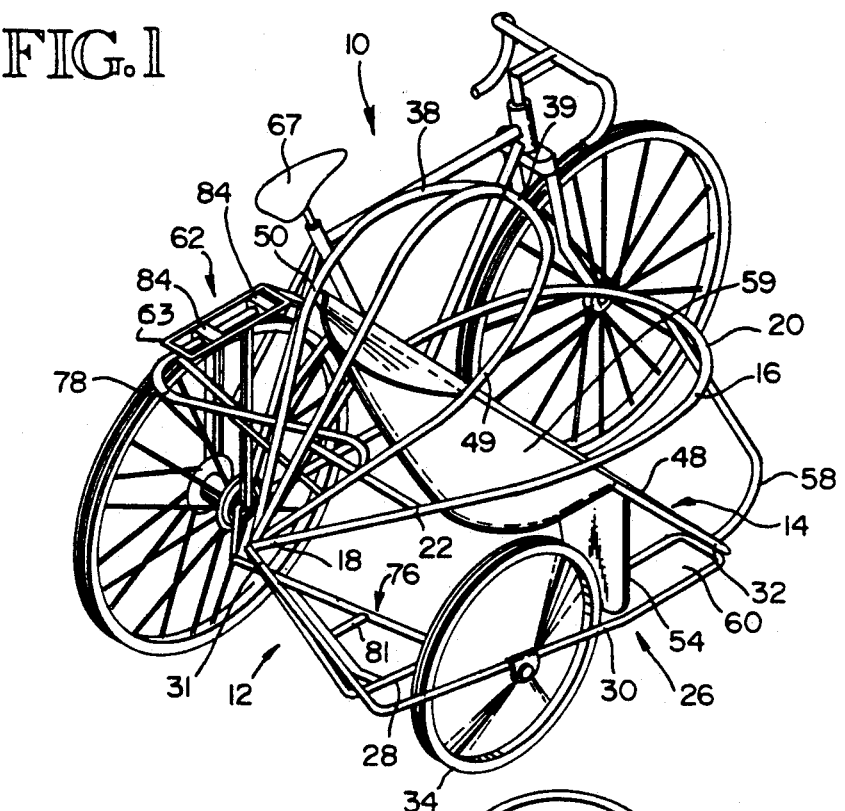
FIG. 1 is a isometric view of one embodiment of the combination of the sidecar of the present invention and a bicycle.
Figure 2:
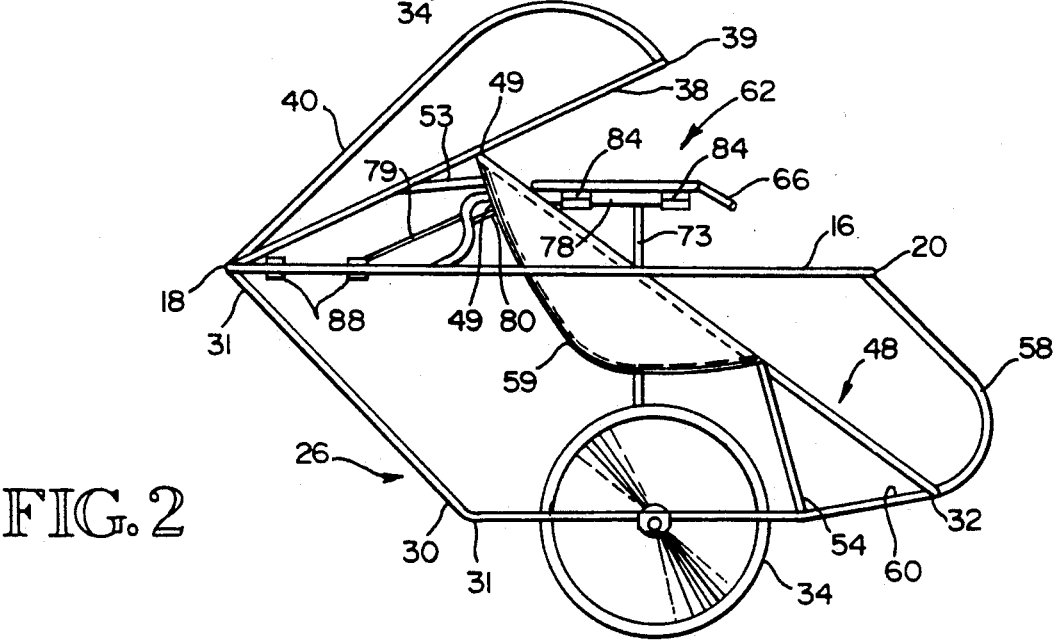
FIG. 2 is a side elevational view of the bicycle sidecar of FIG. 1.

FIGS. 1, 2 and 4 show generally one embodiment of the bicycle sidecar of the present invention. FIG. 1 shows the sidecar relative to a conventional bicycle. The bicycle is shown generally at 10, and for purposes of illustration is a conventional adult-sized bicycle. The sidecar shown generally at 12 includes a frame assembly referred to generally at 14.

The frame assembly includes a first frame element 16 in the form of an elongated loop of one inch aluminum tubing, the loop being approximately 48 inches long from end to end. All other portions of the frame 14 are in the embodiment shown likewise made from one inch aluminum tubing. Alternatively, ⅜ inch thin-walled steel could be used.

The rear end 18 of frame element 16 is blunt relative to the front end 20 thereof, which is curved. A lateral brace element 22 extends between opposite sides of frame element 16, near the rear end 18 thereof. A longitudinal brace 24 extends from the rear end 18 of frame element 16 to the approximate center of lateral brace 22. All of the frame connections in this embodiment are accomplished by welding in the embodiment shown.

A second frame element 26 comprises two elongated sections of tubing 28 and 30. Sections 28, 30 are generally separated by 3¼ inches over their respective lengths but are joined to other frame elements at the rear and front ends 31 and 32, respectively. For instance, rear end 31 of second frame element 26 is joined to the rear end 18 of the first frame element 16. The second frame element 26 extends downwardly at an angle of approximately 60° from its point of connection with the rear end 18 of the first frame element for a length of approximately 22 inches, at which point it becomes basically horizontal, with a slight upward bend near the front end 32 thereof. Approximately midway of the horizontal portion of the second frame element, a wheel 34 is mounted for rotation. In the embodiment shown, the wheel 34 is approximately 16 inches in diameter.

A third frame element is positioned above the first frame element and includes a tubular element 38 basically in the form of an elongated loop which is positioned at an angle of approximately 30° to the first frame element 16. The rear end of the third frame element is blunt (it is joined to the rear end of first frame element 16) while the front end 39 is curved. A bracing element portion 40 of the third frame element extends from the rear end of the third frame element, which joins the rear ends of the first and second elements, curving slightly upwardly toward the front end thereof and then curving downwardly to join the remainder of the third frame element at the front end thereof. It should be noted in the particular embodiment shown that the rear ends of the respective first, second and third frame elements are approximately coincident, so that there is a substantially common joinder point. The third frame element basically provides a frame for an overhead cover for the passenger, while the second frame provides the basic support for the wheel.

A fourth frame element 48 is basically in the form of a loop with one end open. The two free ends 49, 50 of the loop are connected to tubular element 38 of the third frame element at approximately the mid-point between the front and rear ends thereof. The loop element 48 extends from those points downwardly at an angle of about 45° from the vertical, connecting at its lower end to the front end 32 of the second frame element. The first, second, third, and fourth frame elements provide a stable unit, due to their relative arrangement and points of connection, where they are welded together.

A horizontal member 53 extends from tubular element 38 to the fourth frame element 48, approximately 8 inches or so above the first frame element, on the side of the sidecar adjacent the bicycle. The purpose of member 53 will be clarified in following paragraphs.

A loop bracing member 54 (open at the top) extends from the opposite sides of fourth frame element 48 down to the second frame element at a point located at approximately one-third of the overall length of the second frame element from the front end 32 thereof. An additional bracing member 58 curves upwardly from the front end 32 of second frame element 26 to the front end 20 of the first frame element 16, providing a forward protection for the passenger, and also providing a shaping capability for a sidecar cover. The bracing members 54 and 58 also provide additional strength for the sidecar structure.

A section of flexible cloth or plastic material 59 is connected via snaps or the like to the opposite sides of the fourth frame element 48. The material is configured and shaped so as to provide a convenient seat for the user. A platform 60 for the feet of the passenger may be positioned between the two sides of the second frame element 26 forward of loop bracing member 54. In addition, a canopy cover element can be provided across the top of the third frame element and also around the front of the sidecar extending around the forward portions of the first and third frame elements and extending downwardly from the third frame element, thereby providing a capability of completely enclosing the passenger. The various sections of the cover can be connected with zippers or the like. The complete cover is shown at 61 in FIG. 10. A portion 63 of the complete cover 61 will be transparent, so the passenger can see out.

Figure 7:
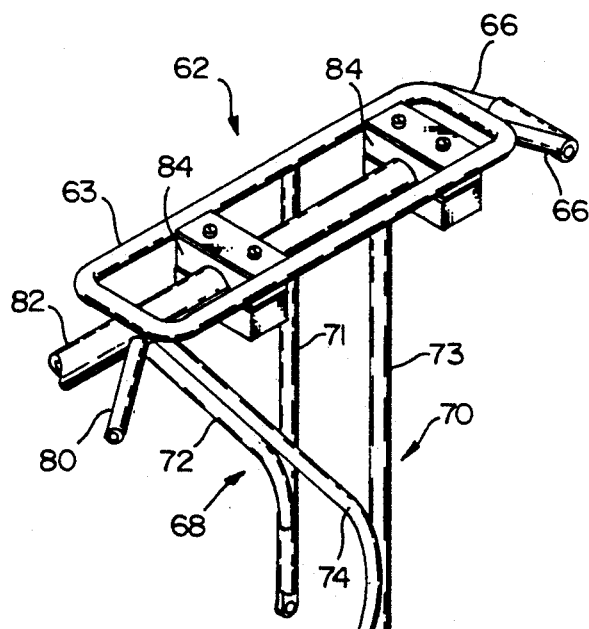
FIG. 7 is an isometric view of the bicycle mounting assembly.

Another major portion of the bicycle sidecar apparatus of the present invention in the embodiment shown is a mounting assembly shown generally at 62 which fits on the back of the bicycle. This is most clearly shown in FIGS. 1 and 7. The mounting assembly 62 includes a rack portion 63 which in the embodiment shown is in the form of a rectangle. Extending from the front end 64 of rack 63 are two prongs 66—66 which attach in conventional fashion to the frame of the bicycle underneath the bicycle seat 67. Two sets of forks 68—70 extend downwardly from the rack 63. The fork sets 68, 70 each include two elongated tubular elements. In fork set 68, one tubular element 71 extends from the midway point of the rack down to the axle of the rear wheel of the bicycle, where it is conventionally connected, while tubular element 72 extends downwardly and at an angle from the rear end of the rack, joining tubular element 71 a small distance above the axle.

Fork set 70 also comprises two tubular elements 73, 74. Tubular element 73 is similar to element 71 for fork set 68 and connects conventionally with the axle of the rear wheel of the bicycle. Tubular element 74 extends from the rear of the rack down to element 73, where it is welded to element 73 but then curves somewhat rearwardly and downwardly as shown, terminating approximately 5 inches below the axle of the bicycle wheel. This extended portion permits connection of the bicycle to the sidecar, as discussed in more detail below.

A first connecting assembly shown generally at 76 extends between the second frame element 26 of the sidecar and the lower end of element 74 of fork set 70 on the bicycle. The connecting assembly is shown in detail in FIG. 5, but also in FIGS. 1 and 4. In the embodiment shown, the connecting assembly 76 includes an elongated tubular member 77 approximately 1 inch in diameter, which extends directly (straight across) between tubular member 74 and the second frame element 26. An angle element 79 extends from member 77 to frame element 26 at a point to the rear of the connection point between member 77 and frame element 26. An additional short bracing member 81 extends between members 77 and 79, giving a triangle effect for the connecting assembly 76.

The connection points between members 77 and 79 and tubular member 74 and second frame element 26, respectively, are swivel-type connections, providing a swiveling capability in the vertical plane of the bicycle and the sidecar, as the bicycle and the sidecar move in operation. In the embodiment shown, the connecting assembly 76 is arranged so that the axle of the sidecar wheel 34 is approximately in the same vertical plane as the axle of the rear wheel of the bicycle.

Figure 6:
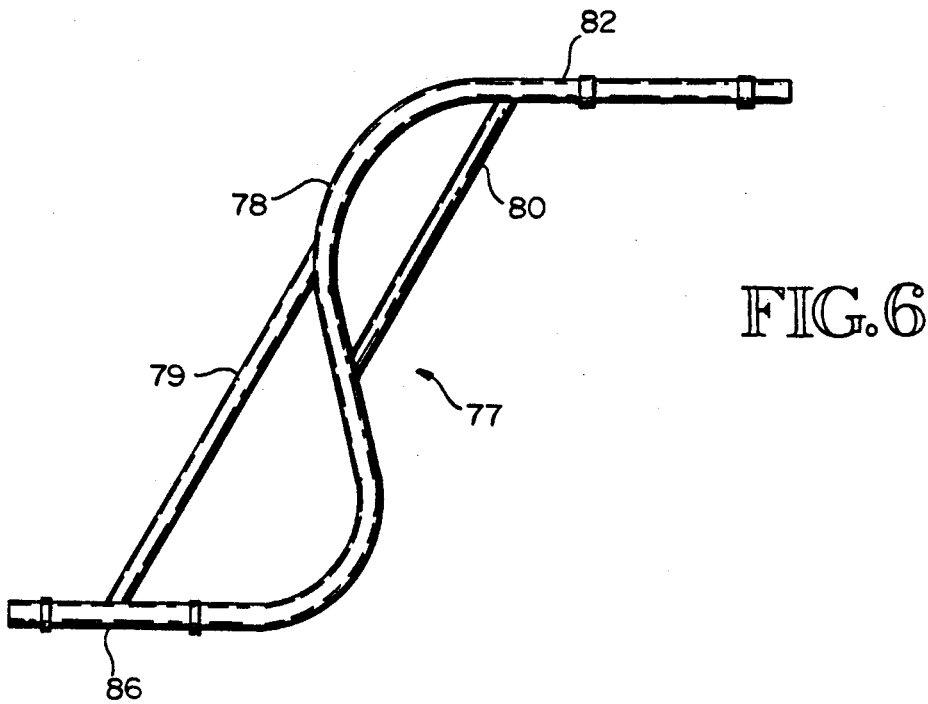
FIG. 6 is a top view of the second connecting assembly of the sidecar of FIG. 1.

A second connecting assembly 77, shown most clearly in FIG. 6, extends between first frame element 16 and the mounting assembly 62 on the bicycle, in particular the rack portion 63 thereof. Connecting assembly 77 comprises a generally S-shaped piece 78 and two parallel brace pieces 79 and 80 which provide lateral bracing for the S-shaped piece 78. The S-shaped piece 78 has two end portions which are substantially straight (and parallel) for a short distance. One end portion 82 of S-shaped piece 78 fits into nylon mounting elements 84—84 which are positioned on rack 63. Mounting elements 84—84 extend downwardly from brackets on rack 63 and are configured relative to the S-shaped piece 78 so as to firmly retain the S-shaped piece but permit rotation of the S-shaped piece in a vertical plane. The other end portion 86 of the S-shaped piece 78 fits into similar nylon mounting brackets 88—88 mounted directly on brace 24 of the first frame element 16. Mounting brackets 88—88 hold the S-shaped piece 78 firmly but permit rotation therein.

The first and second connecting assemblies 76 and 77, the tubular element 74 of fork set 70 and the connection points between connecting assemblies 76 and 77 and the sidecar form an approximate parallelogram in which each of the corner points of the parallelogram is swivelable in the plane of the parallelogram. In the embodiment shown, connecting assembly 77 is slightly longer then connecting assembly 76 (20 inches as opposed to 17 inches) so that the top leg of the parallelogram is slightly longer than the bottom leg. The vertical distance between the connecting assemblies 76 and 77 is approximately 20 inches. It would of course be possible to arrange the points of connection so that an exact parallelogram is achieved.

Figure 10:
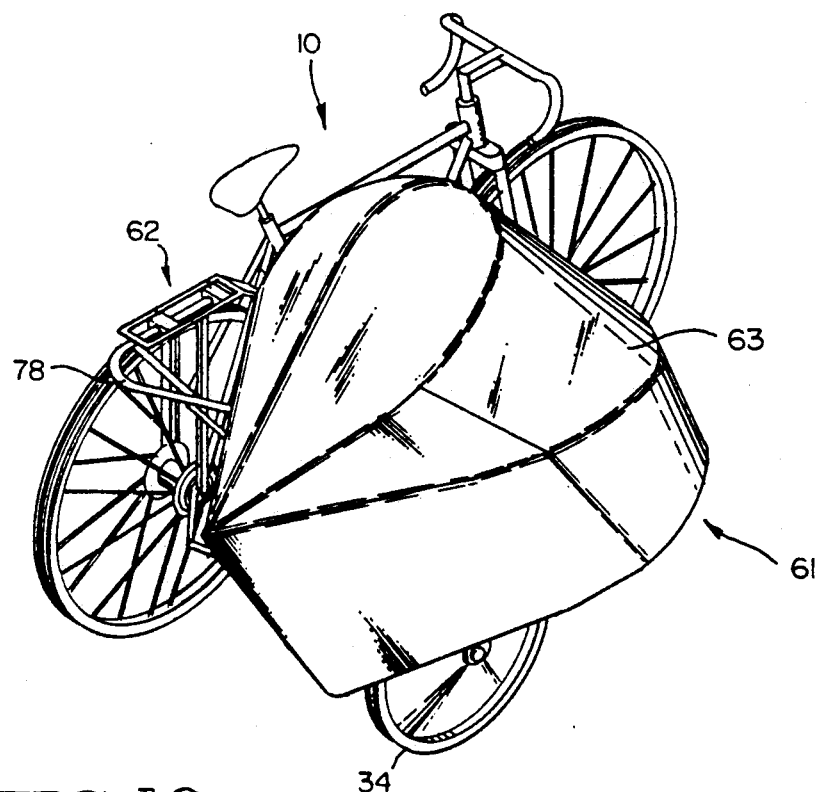
FIG. 10 is an isometric view of the present invention showing a cover element in place on the sidecar assembly.
Figure 11:
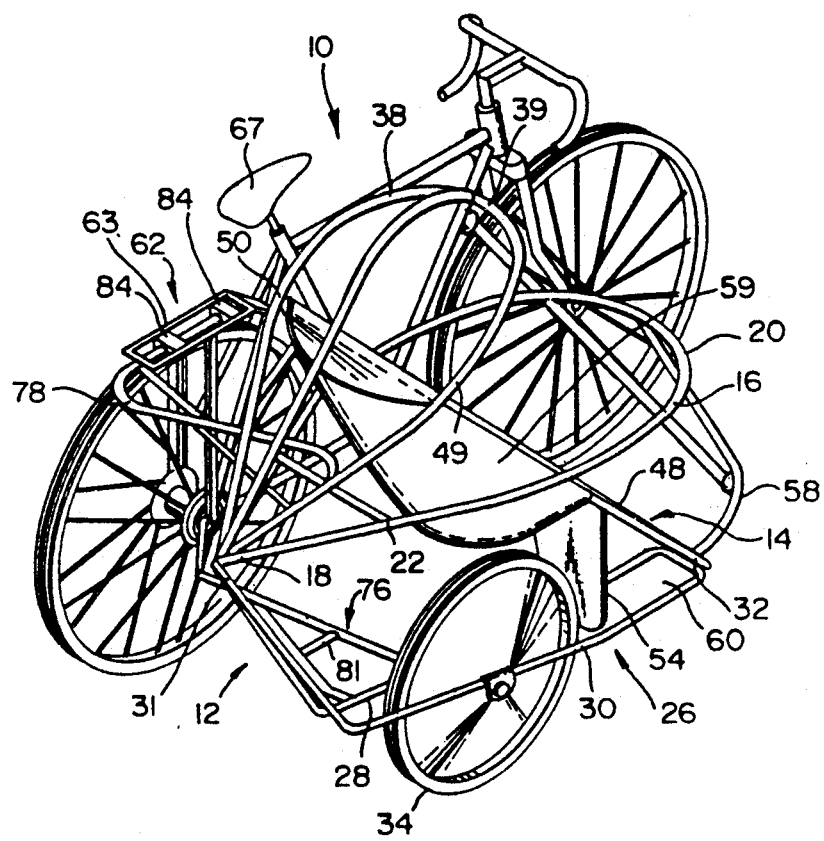

It is this arrangement which provides a combination of structural strength and integrity for the sidecar relative to the bicycle, but also provides an arrangement by which the movement of the sidecar in essence mirrors or parallels the movement of the bicycle, an important consideration. In operation, a passenger is first situated in a seated position in the sidecar. As indicated above, the seat is cloth or other fabric which is configured and designed to accommodate a passenger while being secured to and by the fourth frame element 48 and the brace 54 extending down therefrom to the second frame element 26. Again, as indicated above, the passenger may be completely enclosed with zippered or snap-button coverings which extend around the first frame element forward of the passenger, with a transparent portion in front of the passenger, as shown in FIG. 10.

The bicycle is ridden in conventional fashion. The sidecar, due to its particular connective arrangement with the bicycle, including the position of the wheel on the sidecar relative to the rear wheel on the bicycle, follows the movements of the bicycle. Typically, the sidecar is configured so that the center-of-gravity of the passenger is directly over the sidecar wheel 34. This arrangement has been found to result in improved stability and performance. The sidecar frame assembly is further arranged so that there are limits to how far the sidecar can tilt in one direction or the other. In one direction, the S-shaped piece 78 will abut the first frame element 16, while in the other direction, the S-shaped piece will abut horizontal member 53.

Figure 9:
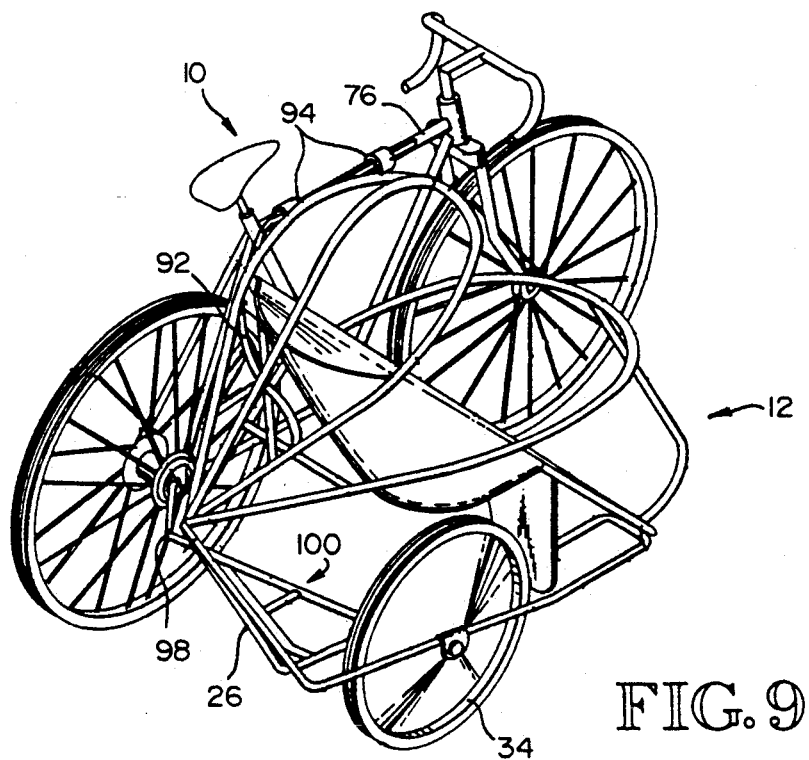
FIG. 9 is an isometric view of a second embodiment of the present invention.

A second embodiment for connecting the sidecar 12 to the bicycle 10 is shown in FIGS. 3 and 9. In the alternative embodiment, the second connecting assembly includes an S-shaped piece 92 which has one end portion 93 which extends for a substantial distance beyond the remainder of the S-shaped piece, arranged and configured so that it mates with mounting brackets 94—94 on the upper horizontal bar 96 of the bicycle. The swiveling arrangement of the S-shaped piece, relative to the mounting brackets 94, however, remains the same. The bicycle mounting assembly is not present in the second embodiment. There is, however, a bracket 98 which is connected to the axle of the rear wheel of the bicycle and extends downwardly therefrom a short distance. A first connecting assembly 100 extends between the bracket 98 and the second frame member 26 of the sidecar in swiveling fashion, as discussed above. The first connecting assembly is generally similar to connecting assembly 76 in the first embodiment.

Figure 8:
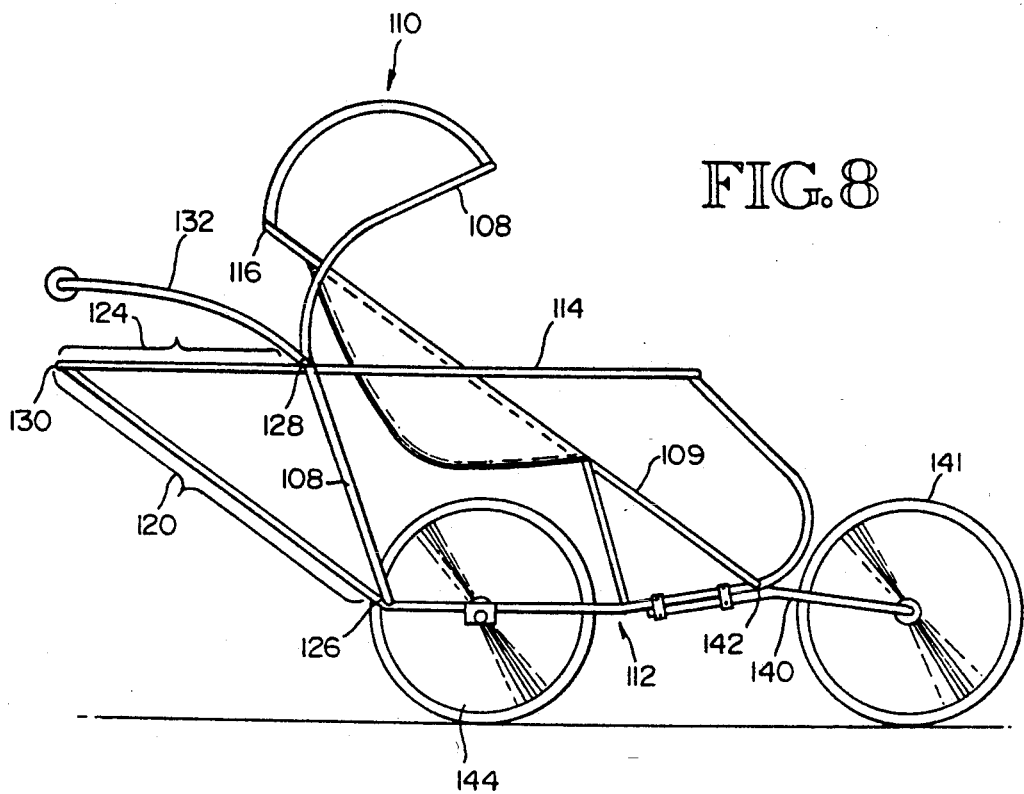
FIG. 8 is a side elevational view of an alternative embodiment for the sidecar of the present invention which is arranged to be convertible to a jogging apparatus.

FIG. 8 shows an outline of another embodiment of a bicycle sidecar which has the additional features of being collapsible and convertable to a jogging stroller. In this embodiment, the first frame element, second frame element and fourth frame elements, as well as the brace elements between the fourth and second frame elements and the first and second frame elements all remain similar to that of FIGS. 1, 2 and 4. In this embodiment, however, a fifth frame element 108 is positioned to the rear of the fourth frame element 109, extending upwardly from the second frame element 112, secured to the first frame element 114, and then extending further upwardly and forwardly, as shown. Frame element 108 is in the shape of a loop, open at the lower end thereof, where the respective free ends are attached to two portions of the second frame element 112. The third frame element 110 in the embodiment of FIG. 8 is a shortened version of the third frame element of the original embodiment, extending from the top end 116 of fourth frame element 109 forwardly and over the seated passenger.

In this embodiment, portion 120 of second frame element 112 and portion 124 of first frame element 114 are rotatable about points 126 and 128, respectively, or they could be removable at those points. Connection point 130 is held by a pin or the like. A handle 132 may be added to connection points 128 on either side of the sidecar, the handle being configured so as to curve to the rear.

An add-on fork 140 with a front wheel 141 is provided to extend from connection point 142 at the front end of the sidecar, connected by means of straps and screws or the like. Two rear wheels 144 are typically provided with a leaf spring to replace the one wheel of the above-described embodiment. When the sidecar of FIG. 8 is disconnected from the bicycle, the sidecar may be conveniently used as a jogging stroller. This embodiment provides flexibility and an alternative use for the sidecar of the present invention, as well as increased flexibility due to its capability of partially collapsing.

An additional connecting assembly could be used between the bicycle and the sidecar, if further stability is desired. The additional connecting assembly would be at the same approximate height as the second connecting assembly of FIG. 1 and could extend from the front of the sidecar to the bicycle downtube located just behind the front wheel, at a point several inches below the top of the downtube.

Also, it is contemplated that the sidecar could be a solid molded unit, from plastic or the like, including a complete solid cover. In such an embodiment, the frame assembly described above in terms of individual members would be in the form of molded ribs and the cover would be solid plastic. The entire sidecar would thus be a single integral unit, with a portion of the cover being removable for ingress and egress of the passenger. The connecting assemblies would remain the same, connecting to mounting brackets on the solid sidecar. The solid sidecar would have the exterior appearance of the unit shown in FIG. 10.

Although a preferred embodiment of the invention has been disclosed herein for purpose of illustration, it should be understood that various changes, modifications, and substitutions may be made without parting from the spirit of the invention, which is defined by the claims which follow:

What is claimed is:

1. A sidecar for a bicycle, comprising:
   a sidecar assembly, including a portion thereof which is adapted to support a passenger, wherein the sidecar assembly includes a wheel positioned within the assembly such that the passenger is positioned substantially directly above the wheel;
   first connecting means extending between the sidecar assembly to the bicycle at points in the vicinity of the axles of the respective wheels;
   a mounting assembly on the bicycle, including a rack-like member which is positioned over the rear wheel of the bicycle the rack-like member including means connecting the rack-like member to the bicycle; and
   second connecting means extending between the sidecar assembly and the rack-like member on the bicycle at points located a distance above the first connecting means, wherein the first connecting means includes movable connections between the sidecar assembly and the bicycle, and wherein the second connecting means includes elongated end portions and wherein the rev-like member and the sidecar assembly include first and second mounting portions which receive the elongated end portions of the second connecting means, the second connecting means being rotatable in the first and second mounting portions, wherein the elongated end portions of the second connecting means are each held stably by said mounting portions over a sufficient portion thereof, substantially greater in length than the cross-sectional dimension of the second connecting means, to prevent movement, other than rotational movement, of the second connecting means relative to the bicycle and the sidecar so as to prevent movement of the sidecar forward and rearward relative to the bicycle, such that the sidecar is maintained in stable alignment with the bicycle and such that the sidecar does not substantially interfere with movement of the bicycle, but moves therewith.

2. An apparatus of claim 1 wherein the first and second connecting means form an approximate parallelogram with the bicycle and the sidecar, the parallelogram having four corners, each of which swivels in the plane of the parallelogram.

3. An apparatus of claim 1, wherein the means connecting the rack-like member with the bicycle further includes fork means on opposite sides of the rack-like member which extend downwardly to and connect with the axile of the rear wheel of the bicycle, wherein a portion of the fork means facing the sidecar extends downwardly below the axle of the rear wheel, the second connecting means extending between the lower end of the fork means portion nd the side car assembly and wherein the second connecting means comprises an S-shaped element, wherein one end portion thereof fits into first mounting brackets comprising the mounting portion on the rack-like member and wherein the other end portion fits into second mounting brackets comprising the mounting portion on the sidecar assembly, the S-shaped piece being rotatable with respect to both first and second mounting brackets.

4. An apparatus of claim 1, wherein the sidecar assembly includes a first generally oval-shaped, generally horizontal element, a second element which extends downwardly from the rear end of the first element and then forwardly to a point slightly beyond the first element and a third hoop-like element extending at an angle between the first and second elements to a point slightly above the first element nd a seat assembly supported by the third member for a passenger.

5. An apparatus of claim 4, including a fourth element which extends from the rear end of the first element forwardly and upwardly, thereby forming a hood-like arrangement over the passenger, wherein the third element connects to the fourth element at the upper end of the third element.

6. An apparatus of claim 1, wherein the sidecar assembly is a solid, integral unit and includes a rigid cover extending over a substantial portion of the assembly.

7. An apparatus of claim including a flexible cover which extends around the exterior of at least a portion of the sidecar assembly.

8. An apparatus of claim 1, including third connecting means swivelly connecting the sidecar assembly and the bicycle, extending between the a a the end of the sidecar assembly and the bicycle at a point slightly to the rear of the front wheel, and wherein the third connecting means is at the same approximate height as the second connecting means.

* * * * *

UNITED STATES PATENT AND TRADEMARK OFFICE
CERTIFICATE OF CORRECTION

PATENT NO. : 5,248,158
DATED : Sep. 28, 1993
INVENTOR(S) : Terence R. Ellard

It is certified that error appears in the above-identified patent and that said Letters Patent is hereby corrected as shown below:

In the claims:

Column 6
Claim 1, line 61, a comma should appear after the word "bicycle".
Column 7,
Claim 1, line 3, the word "rev-like" should be --rack-like--.

Claim 3, line 31, the word "axile" should be --axle--.

Claim 3, line 35, the term "nd" should be --and--.
Column 8,
Claim 4, line 15, the term "nd" should be --and--.

Claim 7, line 26, the term --1,-- should appear after the word "claim".

Claim 8, line 31, the term "a-a-the" should be --front--.

Signed and Sealed this

Twelfth Day of April, 1994

Attest:

BRUCE LEHMAN

Attesting Officer     Commissioner of Patents and Trademarks